US011966048B1

(12) United States Patent
Oudenhoven et al.

(10) Patent No.: US 11,966,048 B1
(45) Date of Patent: Apr. 23, 2024

(54) HEAD-MOUNTED DEVICES WITH DUAL GAZE TRACKING SYSTEMS

(71) Applicant: Apple Inc., Cupertino, CA (US)

(72) Inventors: Michael J. Oudenhoven, San Francisco, CA (US); Brian S. Lau, Sacramento, CA (US); David A. Kalinowski, Davis, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/343,528

(22) Filed: Jun. 9, 2021

Related U.S. Application Data

(60) Provisional application No. 63/050,040, filed on Jul. 9, 2020.

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 2027/0138* (2013.01); *G02B 2027/0178* (2013.01)

(58) Field of Classification Search
CPC .................................................. G02B 27/0093
See application file for complete search history.

(56) References Cited

U.S. PATENT DOCUMENTS

| | | | |
|---|---|---|---|
| 6,578,962 B1 | 6/2003 | Amir et al. | |
| 8,824,779 B1 | 9/2014 | Smyth | |
| 8,878,749 B1 * | 11/2014 | Wu | G03B 29/00 |
| | | | 351/209 |
| 9,244,170 B2 | 1/2016 | Blixt et al. | |
| 9,285,872 B1 * | 3/2016 | Raffle | G06F 3/012 |
| 9,370,302 B2 | 6/2016 | Krueger | |
| 9,625,723 B2 | 4/2017 | Lou et al. | |
| 9,983,666 B2 | 5/2018 | Lankford et al. | |
| 10,234,940 B2 | 3/2019 | Mardanbegi et al. | |
| 2013/0050833 A1 * | 2/2013 | Lewis | G06T 7/73 |
| | | | 359/630 |
| 2013/0106681 A1 * | 5/2013 | Eskilsson | G02B 27/0172 |
| | | | 345/156 |

(Continued)

*Primary Examiner* — William Boddie
*Assistant Examiner* — Andrew B Schnirel
(74) *Attorney, Agent, or Firm* — Treyz Law Group, P.C.; G. Victor Treyz; David K. Cole

(57) ABSTRACT

A head-mounted device may have a head-mounted support structure. Gaze tracking systems may be supported by the support structure so that the gaze of a user may be monitored. Lenses may be supported by the support structure. Display systems may provide computer-generated images to the user while the user is viewing real-world objects through the lenses. The gaze tracking systems may include image-sensor-based systems such as glint-based systems. A glint-based gaze tracking system may include light-emitting devices that emit light beams that create eye glints on the surface of a user's eyes and may include an image sensor that measures the eye glints to gather information on the user's gaze. A low-power gaze tracking system may be included in the head-mounted device. The low-power gaze tracking system may use light detectors to measure the magnitudes of respective light reflections of the light beams.

15 Claims, 7 Drawing Sheets

(56) References Cited

U.S. PATENT DOCUMENTS

| | | | |
|---|---|---|---|
| 2014/0078333 A1* | 3/2014 | Miao | H04N 5/2251 |
| | | | 348/222.1 |
| 2014/0375789 A1* | 12/2014 | Lou | G02B 27/0172 |
| | | | 348/78 |
| 2015/0309568 A1* | 10/2015 | Miki | G06F 3/0304 |
| | | | 345/173 |
| 2016/0073876 A1* | 3/2016 | Akita | G02B 27/145 |
| | | | 351/206 |
| 2018/0067212 A1* | 3/2018 | Wilson | H04M 1/02 |
| 2019/0101980 A1* | 4/2019 | Stafford | G02C 11/10 |

* cited by examiner

HEAD-MOUNTED DEVICES WITH DUAL GAZE TRACKING SYSTEMS

This application claims the benefit of provisional patent application No. 63/050,040, filed Jul. 9, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

A head-mounted device may have a head-mounted support structure. During use of the head-mounted device, the head-mounted support structure may be worn on the head of a user.

Gaze tracking systems may be used to gather information on the direction of the user's gaze. The head-mounted support structure may form a pair of glasses or other head-mounted housing. The glasses may include, for example, a frame and a pair of temples or other elongated side support members that are coupled to the frame by hinges.

Glasses lenses (e.g., transparent lens members with or without an associated lens power) may be supported by the frame. Display systems on the left and right sides of the device may provide computer-generated images to the user while the user is viewing real-world objects through the lenses. In some configurations, selectable menus and other selectable items may be displayed over real-world images.

The gaze tracking systems may include image-sensor-based systems such as eye-glint-based systems. A glint-based gaze tracking system may include light-emitting devices that emit light beams that create eye glints on the surface of a user's eyes and may include an image sensor that measures the eye glints. The pattern of eye glints may be analyzed to produce information on the user's gaze.

The gaze tracking systems may also include a low-power gaze tracking system. The low-power gaze tracking system may use light detectors to measure light reflections from the user's eyes. The light reflections may correspond to reflections of the light beams emitted by the light-emitting devices used by the glint-based gaze tracking system. The user's gaze may be measured by analyzing the magnitudes of the detected light reflections.

The head-mounted device may use different gaze tracking systems in different operating modes. For example, a glint-based gaze tracking system or other system based on an image sensor may, in a given mode of operation, be used to gather gaze information to supplement and/or replace gaze tracking information from a low-power gaze tracking system. In another mode of operation, the low power gaze tracking system may be used to track the user's gaze without using the glint-based gaze tracking system.

DETAILED DESCRIPTION

Head-mounted devices include head-mounted support structures that allow the devices to be worn on the heads of users. Head-mounted devices may include input-output devices for gathering input and supplying a user with output. For example, head-mounted devices may include speakers for presenting a user with audio output and/or may include displays for presenting a user with visual content.

During use of a head-mounted device, it may be desirable to monitor the direction in which a user is gazing. For example, information on the user's gaze (direction of viewing) may be used as input to the device, may be used to help efficiently display foveated content (content rendered using a foveated rendering scheme) on a display, may be used to determine which virtual and/or real objects in the user's field of view are currently being viewed by the user to provide the device with context (e.g., so that a user may request more information about the currently viewed object, so that the device can automatically supply such information, etc.), and/or may otherwise be used by the head-mounted device.

A head-mounted device may include one or more gaze tracking systems such as systems based on image sensors that detect and process eye glints (eye reflections arising when the eye is illuminated by light-emitting diodes or other light-sources near the eye) and/or that detect and process images of the user's eye (e.g., retinal images, images of the user's pupil, etc.). Gaze tracking systems such as these may operate at infrared and/or visible wavelengths.

To supplement these devices and to potentially help reduce bulk, complexity, and power consumption, the head-mounted device may be provided with a low-power gaze tracking system. The low-power gaze tracking system may consume less power during operation than the glint-based gaze tracking system and can be used where the capabilities of the glint-based gaze tracking system are not desired. In some configurations, the device may switch between operating in a first mode in which only the low-power gaze tracking system is used and a second mode in which the glint-based gaze tracking system is used (and in which the low-power system is optionally used).

Figure 1:
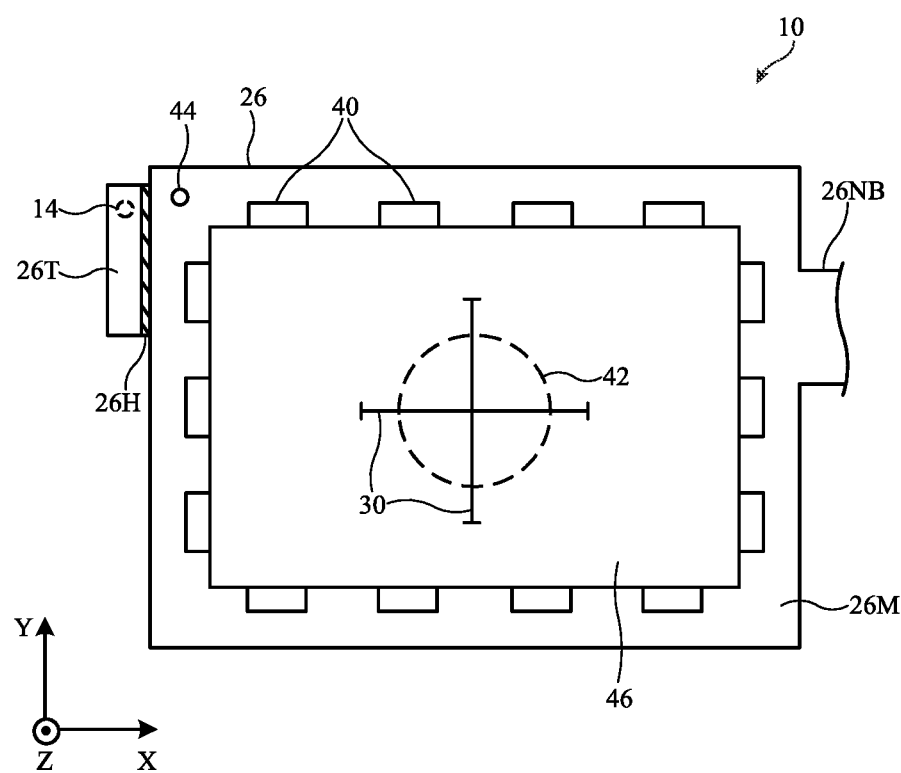
FIG. 1 is a front view of an illustrative electronic device such as a head-mounted device in accordance with an embodiment.

FIG. 1 is a front view of a portion of an illustrative head-mounted device. As shown in FIG. 1, electronic device 10 may include head-mounted support structure 26 to house the components of device 10 and to support device 10 on a user's head. Support structure 26 may include, for example, portion 26M (sometimes referred to as a glasses frame, main support member, main housing portion, or main portion) that rests in front of a user's face during use. Portion 26M may include a nose bridge portion such as portion 26NB that connects the left and right sides of portion 26M. Left and right lenses such as illustrative lens 46 may be supported by portion 26M in front of a user's left and right eyes, respectively (see, e.g., eye 42). Support structure portions such as portion 26T may extend along the sides of a user's head (e.g., into the page in the orientation of FIG. 1). Portions of structure 26 such as portion 26T of FIG. 1, which may sometimes be referred to as glasses temples or elongated side support members, may be coupled to portion 26M by hinges 26H (as an example). In this type of arrangement, support structure 26 may be configured to form a pair of glasses. If desired, support structure 26 may have portions forming straps, googles, structures for hats or helmets, and/or other head-mounted housings.

During operation of device 10, images may be presented to a user's eyes in eye boxes such as eye box 30. For example, each side of device 10 may have a display projector or other display 14 (e.g., a scanning mirror display or other display device) that creates a computer-generated image. Using an input coupler (e.g., a prism or holographic input coupler), this image may be coupled into a waveguide that extends across an associated lens 46 in front of an associated eye box 30. The image from the display may travel through the waveguide in accordance with the principal of total internal reflection. Lens 46 may include an output coupler (e.g. a holographic output coupler or other suitable output coupler on the waveguide) that directs the image out of the waveguide towards the user's eye 42 in an associated eye box 30.

Eye boxes 30 include a left eye box that receives a left image and a right eye box that receives a right image. FIG. 1 shows only a single display 14 and lens 46 overlapping a single eye 42 in a single eye box 30. Device 10 preferably includes a left display system with a left display 14 that presents the left image to the left eye box and a right display system with a right display 14 that presents the right image to the right eye box.

In addition to serving as a waveguide or supporting substrate for a waveguide to help route image light from displays 14 to eye boxes 30, lenses 46 may form optical combiner assemblies. Lenses 46 may, for example, be formed from a layer of clear material such as transparent polymer or glass that allows the user to view real-world objects through lenses 46. In this way, the optical system formed by the waveguide, output coupler, and lens 46 overlapping each eye box serves as an optical combiner assembly that can be used to combine display images (e.g., computer-generated content from displays 14, which may sometimes be referred to as virtual image content, virtual images, or computer-generated images) with real-world image light (e.g., light from real-world objects, sometimes referred to as real-world images).

If desired, device 10 may have left and/or right forward-facing cameras (see, e.g., forward-facing camera 44 of FIG. 1) and/or other cameras for capturing images of real-world objects. These images, which may include still and/or moving images, may be processed using pattern recognition techniques (e.g., to identify the locations of surfaces, edges, objects, and/or other features in a scene, to identify buildings and other items in a scene, etc.), may be displayed on a display for a user, may be transmitted to remote equipment for processing, and/or may otherwise be used during the operation of device 10.

Gaze tracking information can be gathered using gaze tracking components 40. As shown in FIG. 1, gaze tracking components 40 may extend in a ring around the periphery of lens 46. Lens 46 may be rectangular (with rounded or straight corners), circular, oval, teardrop shaped, and/or may have other suitable outlines. Components 40 may include light-emitting devices (e.g., laser diodes, light-emitting diodes, etc.) and light-detecting devices (e.g., photodetectors such as photodiodes, image sensors, etc.).

Components 40 may operate at visible wavelengths and/or infrared wavelengths. For example, components 40 may emit and detect infrared light having a wavelength of at least 850 nm, 870 nm, 850-1000 nm, at least 860 nm, at least 900 nm, less than 1400 nm, less than 1200 nm, less than 1100 nm, less than 1000 nm, less than 950 nm, 940 nm, less than 930 nm, 900-1000 nm, etc. There may be any suitable number N of gaze tracking components 40 surrounding each lens 46 in device 10 (e.g., the value of N may be at least 3, at least 5, at least 10, at least 15, 3-8, 4-20, 5-15, less than 25, less than 20, less than 16, less than 12, less than 8, or other suitable value).

Figure 2:
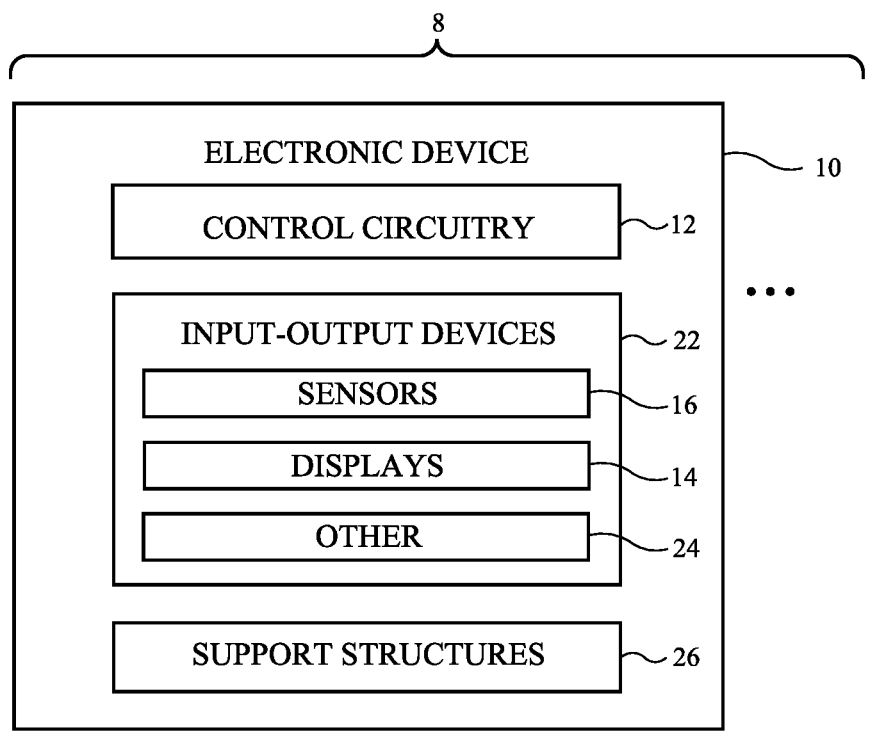
FIG. 2 is a schematic diagram of an illustrative electronic device in accordance with an embodiment.

A schematic diagram of an illustrative system that may include a head-mounted device such as device 10 of FIG. 1 that gathers gaze information during device operation is shown in FIG. 2. As shown in FIG. 2, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example. Head-mounted devices may include goggles, helmets, glasses, and/or other equipment that may be worn over a user's eyes.

As shown in FIG. 2, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more optional displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

Displays 14 may be used to display visual content for a user of device 10. The content that is presented on displays 14 may include virtual objects and other content that is provided to displays 14 by control circuitry 12 using optical combiner assemblies in device 10 that overlap eye boxes 30. The optical combiner assemblies may also allow the user to view real-world content through lenses 46.

Input-output circuitry 22 may include sensors 16. For example, sensors 16 may include gaze tracking sensors (e.g., a gaze tracking system based on an image sensor and, if desired, a light source that emits one or more beams of light that are tracked using the image sensor after reflecting from a user's eyes, a low-power gaze tracking system formed using photodetectors, etc.). Sensors 16 may also include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative head-mounted support structure 26. Structure 26 may be formed from polymer, glass, metal, carbon-fiber materials and/or other fiber-composite materials, ceramic, wood, leather, and/or other natural materials, fabric, other materials, and/or combinations of two or more of these materials.

As a user is walking down a street or otherwise interacting with the environment surrounding the user, the user may observe real-world objects. At the same time, computer-generated content may be provided to the user using displays 14. Gaze tracking operations may be used to monitor the direction in which the user is viewing real-world objects and may therefore be able to help determine the identify of objects being observed by the user. In identifying the objects being viewed by the user, device 10 may, as an example, determine the user's location from a satellite navigation system receiver and determine the orientation of device 10 at that location using an inertial measurement unit or other orientation sensors. By using online database information in addition to geographical information, device orientation information, and information on the user's gaze, and optional forward-facing camera images of the environment, the objects being viewed by the user can be identified. Information on the user's gaze may also be used as a form of user input (e.g., eye gesture input).

Figure 3:
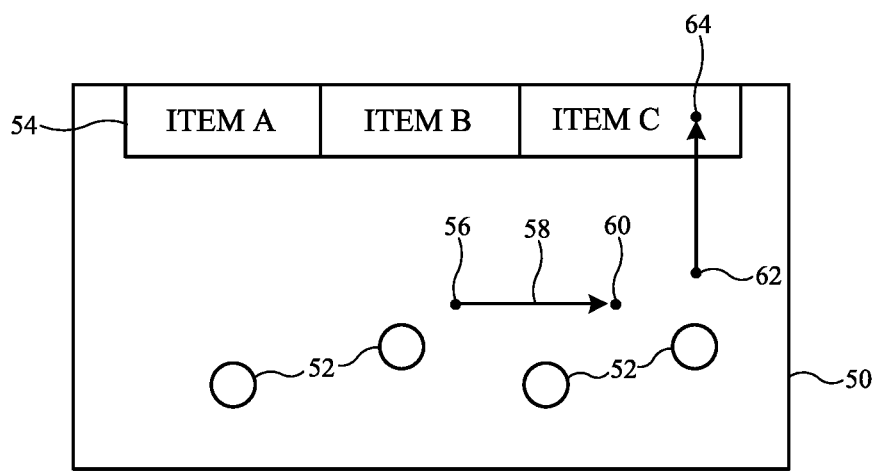
FIG. 3 is a diagram of illustrative computer-generated (virtual) content merged with real-world content in a user's field of view in accordance with an embodiment.

Consider, as an example, the illustrative arrangement of FIG. 3. FIG. 3 shows an image that is being viewed by a user through lens 46. Image 50 includes real-world content such as real-world objects 52 that are being observed through lens 46 in real time. Image 50 may also include computer-generated images such as computer-generated content 54. In the example of FIG. 3, content 54 includes multiple selectable menu items (e.g., items A, B, and C).

A user may interact with device 10 by moving the user's eyes. Device 10 may, as an example, initially be operating in a mode in which content 54 is not being displayed. In this mode, the user may be gazing in gaze direction 56. To direct device 10 to display content 54 (e.g., to invoke an interactive menu or other computer-generated information), the user may provide device 10 with eye gesture input (e.g., by sweeping the user's eye in a particular direction, by holding the user's gaze at a particular fixed point for more than a predetermined amount of time, by altering the user's gaze in accordance with other predetermined gesture patterns, etc.). As an example, the user may move their gaze to the right in direction 58 to gaze direction 60.

This movement (sweeping the user's gaze from direction 56 to direction 60) may be detected by the gaze tracking system(s) of device 10. In response, device 10 may use displays 14 to update image 50 so that content 54 is displayed (e.g., along one of the peripheral edges of image 50 and/or at other suitable locations in image 50). Once content 54 is being displayed, a user may move their gaze from a first location such as gaze direction 62 to a second location that overlaps with a desired item in content 54 (e.g., gaze direction 64, which is associated with item C). By dwelling their gaze in direction 64 for more than a predetermined amount of time, the user may select item C and device 10 can take suitable action in response (e.g., by playing audio, by providing a submenu associated with item C, by invoking a particular mode of operation, and/or by otherwise performing functions associated with selected item C).

Another illustrative way in which a user may select an item of interest involves dwelling their gaze on a particular real-world object 52 for more than a predetermined time. Device 10 can then use pattern recognition to process image data associated with the object and can highlight the object, provide additional information (audio output and/or video output associated with the object being viewed, etc.), and/or take other actions. Device 10 may, if desired, access an online database of real-world objects 52 and may use satellite navigation system circuitry, orientation sensor data (e.g., orientation information from an inertial measurement unit indicating which direction device 10 is facing), and/or other supplemental information in addition to gaze tracking measurements to determine which object 52 is currently being viewed by user.

As this example, demonstrates, it may be desirable to be able to track the user's gaze, so that device 10 can provide the user with gaze-related services. In some situations, it may be particularly desirable to track the user's gaze with as much accuracy as possible given the resources available in device 10 (e.g., when the battery of device 10 is fully charged, when device 10 is connected to a wired power source, when particular content is being displayed for a user, when the user is playing a video game or otherwise interacting with content in a way that benefits from gaze tracking of enhanced accuracy, and/or in other scenarios). In other situations, e.g., when a user is casually walking outdoors and is not actively interacting with device 10, lower resolution and lower power modes of operation may be desirable. To accommodate these potentially diverse situations, device 10 may operate in a first mode in which only low-power gaze tracking operations are used or a second mode in which higher-power and potentially more accurate gaze tracking operations are used.

Figure 4:
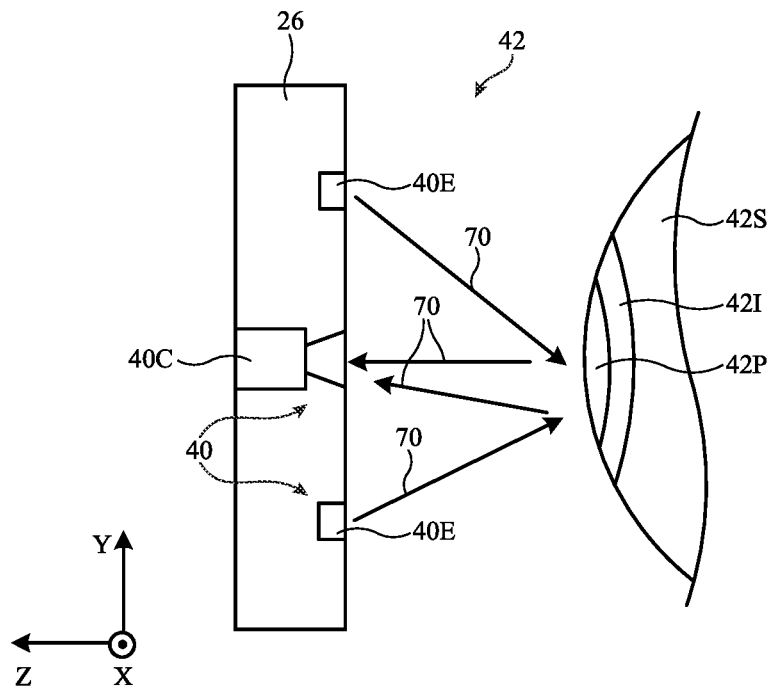
FIG. 4 is a side view of an illustrative glint-based gaze tracking system in accordance with an embodiment.
Figure 5:
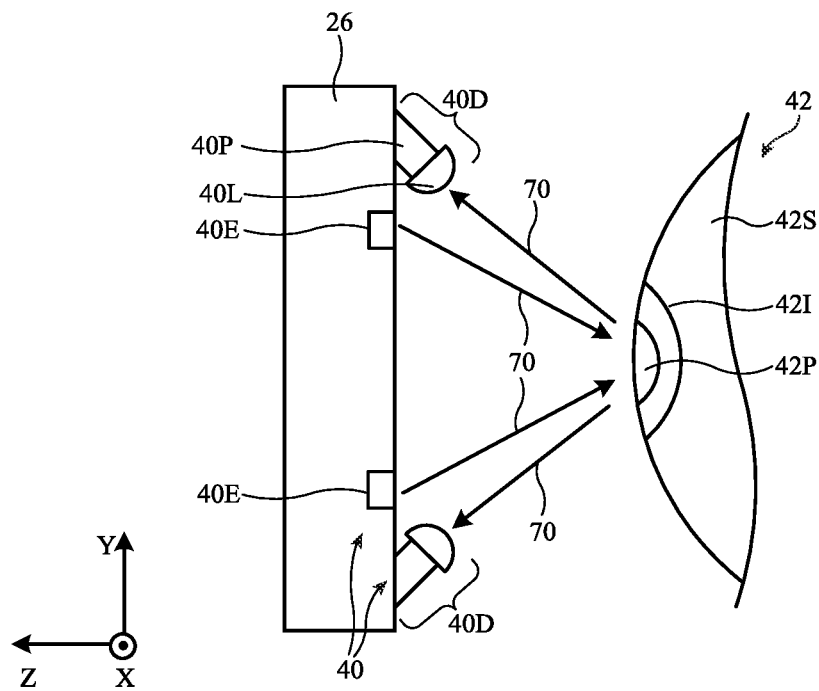
FIG. 5 is a side view of an illustrative low-power gaze tracking system of the type that may share light-emitting devices with the glint-based gaze tracking system of FIG. 4 in accordance with an embodiment.

FIGS. 4 and 5 show illustrative gaze tracking components that may be used in device 10 to track the user's gaze.

In the example of FIG. 4, components 40 include light-emitting devices 40E and camera 40C and form a glint-based gaze tracking system. Components 40 may operate at visible and/or infrared wavelengths (e.g., components 40 may emit and detect infrared light having a wavelength of at least 850 nm, 870 nm, 850-1000 nm, at least 860 nm, at least 900 nm, less than 1400 nm, less than 1200 nm, less than 1100 nm, less than 1000 nm, less than 950 nm, 940 nm, less than 930 nm, 900-1000 nm, etc.).

Light-emitting devices 40E may be laser diodes, light-emitting diodes, and/or other light sources. These light-emitting devices may emit beams of light such as light beams 70 that form a pattern of eye glints when reflected from the surface of the user's eye 42. The pattern of glints on eye 42 may be measured by capturing an infrared image of eye 42 using infrared camera 40C. Eye 42 has a non-spherical asymmetric shape and includes pupil 42P and iris 42I surrounded by sclera 42S. As a result of the aspherical shape of the eye, the shape of the glint pattern is distorted by the shape of the eye and relates to the direction in which the user's eye is oriented. The glint pattern detected by camera 40C can therefore be analyzed by control circuitry 12 to measure the user's gaze.

In the example of FIG. 5, some of the power-consuming circuitry of FIG. 4 such as camera 40C need not be used and can be turned off, therefore allowing for a potentially lower power of operation. As shown in FIG. 5, a low-power gaze tracking system for device 10 may, as an example, include light detectors 40D. Each detector 40D may have an associated photodetector 40P (e.g., a photodiode) and an associated lens 40L that is used to concentrate the sensitivity of detector 40D in measuring incoming light onto an area on the surface of eye 42 (e.g., by collimating light). The low-power gaze tracking system of FIG. 5 may have light-emitting devices 40E. Some or all of light-emitting devices 40E for the low-power gaze tracking system may be used in producing glints for the glint-based gaze tracking system of FIG. 4 (e.g., some or all of devices 40E may be the same for both the glint-based and low-power systems). As described in connection with FIG. 4, light-emitting devices 40E may operate at infrared wavelengths (as an example). Detectors 40D may be sensitive to light at the wavelength(s) emitted by devices 40E.

During operation of the low-power gaze tracking system made up of components 40 of FIG. 5, each light-emitting device 40E emits light (see, e.g., light beams 70). Light beams 70 reflect from the surface of eye 42. In an illustrative configuration each light beam 70 that is emitted by a given one of light-emitting devices 40E is detected by a respective adjacent one of light detectors 40D. Different portions of eye 42 have different reflectivities. For example, a greater fraction of each light beam 70 will reflect off of sclera than off of pupil 42P or iris 42I. By measuring the magnitude of each of reflected light beams 70, detectors 40D can determine whether each light beam has reflected from a less reflective area such as pupil 42P or iris 42I or from a more reflective portion of the user's eye (sclera 42S) and can measure the user's gaze. If for example, a given light-emitting device 40E emits a beam of light 70 that reflects from pupil 42P to an adjacent light detector 40D, it can be concluded that pupil 42P is oriented towards the given light-emitting device 40E. If the emitted beam of light 70 instead reflects from sclera 42S, device 10 can conclude that the user's gaze is directed away from that beam of light. The operation of light detectors 40D may consume less power than the operations of components such as camera 40C in the glint-based gaze tracking system of FIG. 4, so gaze tracking systems such as the illustrative gaze tracking system of FIG. 5 may sometimes be referred to as low-power gaze tracking systems or non-glint-based gaze tracking systems.

Figure 6:
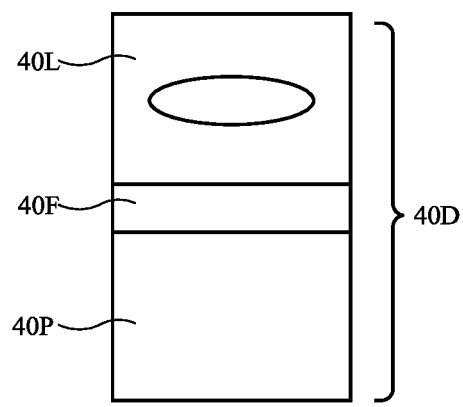
FIG. 6 is a diagram of an illustrative light detector for a low-power gaze tracking system in accordance with an embodiment.

If desired, gaze system components 40 may include optical filters (e.g., bandpass filters). For example, camera 40C of FIG. 4 may include a lens, an infrared image sensor, and a bandpass filter interposed between the lens and the infrared image sensor. The bandpass filter may block visible light and infrared light other than the wavelength(s) of infrared light being emitted by light-emitting devices 40E. Detectors 40D of FIG. 5 may also be provided with bandpass filter if desired. As shown in FIG. 6, as an example, each light detector 40D may include an infrared-sensitive photodetector such as photodetector 40P, an associated lens such as lens 40L (e.g., one or more refractive lens elements or other lens structures that help directionalize the sensitivity of detector 40D), and an interposed light filter 40F (e.g., a bandpass filter that blocks visible light and infrared light other than infrared light at the wavelength(s) being emitted by light-emitting devices 40E). The inclusion of bandpass filters in gaze tracking system components 40 such as these may help prevent ambient light interference and other light interference during operation of the gaze tracking systems.

Figure 7:
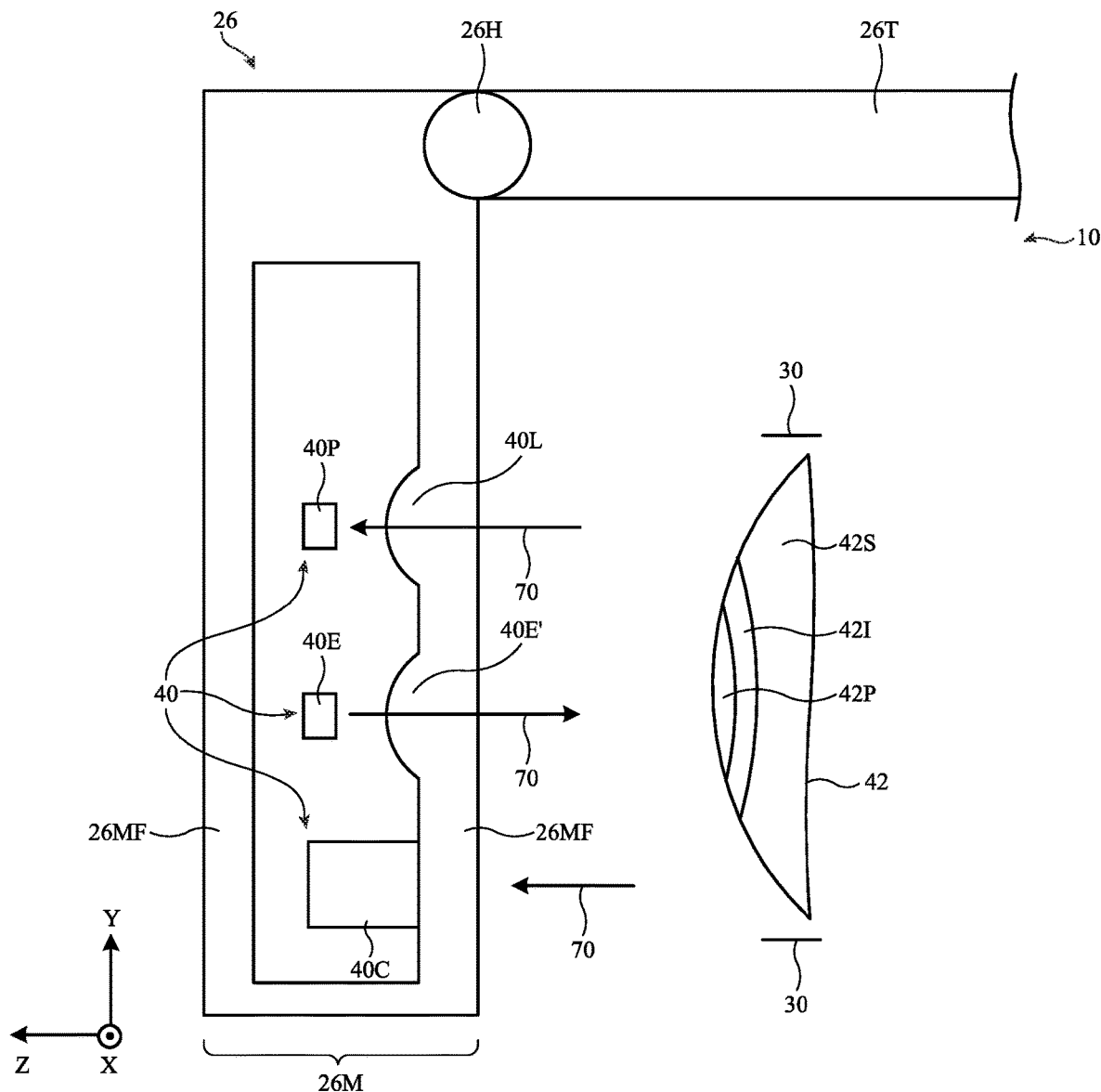
FIG. 7 is a cross-sectional side view of an illustrative head-mounted device being used to measure a user's gaze in accordance with an embodiment.

If desired, portions of support structure 26 may be used in forming light filtering and lens structures. These structures may be, for example, formed as integral portions of housing walls and/or as separate structures that are attached to a housing member. Consider, as an example, the arrangement of FIG. 7, which includes a side view of device 10. As shown in FIG. 7, device 10 may include a support structure (structure 26) with an elongated side portion 26T (e.g., a portion that fits around a user's ear) attached to main portion 26M by hinge 26H. Main portion 26M may include an outwardly facing front wall 26MF and an inwardly facing (rear facing) rear wall 26MR. Lenses 46 (not shown in FIG. 7) may be supported by structure 26 so that lenses 46 overlap respective eye boxes 30. At the same time, structure 26 may support gaze tracking system components 40 in a first ring that surrounds the user's left eye and left eye box and a second ring that surrounds the user's right eye and right eye box.

The material that forms portion 26M may include polymer, metal, other materials, one or more layers of one or more of these materials, and/or other suitable materials. As an example, the material of portion 26M may contain dyes, pigments, and/or thin-film interference structures that allow portion 26M to pass infrared light at the wavelength emitted by light-emitting devices 40E and detected by cameras 40C and light detectors 40D, while blocking other infrared light and blocking visible light. Visible-light-blocking-and-infrared-light-transmitting material for a pair of glasses frames may, for example, form housing wall structures such as rear wall 26MR of FIG. 7 (and, if desired, other parts of portion 26M). In this way, bandpass filters for components 40 may be formed by portion 26M (e.g., wall 26MR, etc.).

Lenses such as illustrative lenses 40L and 40E' of FIG. 7 may also be formed as integral portions of portion 26M (e.g., these structures may be molded into rear wall 26MR or otherwise incorporated into portion 26M). Lenses such as lens 40L of FIG. 7 may help concentrate the sensitivity of photodetector 40P in a particular direction (e.g., a direction oriented at a portion of eye 42 in eye box 30). Lenses such as lens 40E' may optionally be used to focus light beams 70 onto eye 42. Lenses and other optical structures such as curved reflectors may also be incorporated into a light-emitting diode package, a laser package, or other package for light-emitting device 40E.

With configurations of the type shown in FIG. 7, the presence of visible-light-blocking-and-infrared-light-transmitting material between components 40 and eye 42 helps hide components 40 from view by a user, thereby enhancing the appearance of device 10. If desired, components 40 may be mounted on an inner surface of structure 26 and/or may otherwise be incorporated into device 10. The configuration of FIG. 7 is illustrative.

Figure 8:
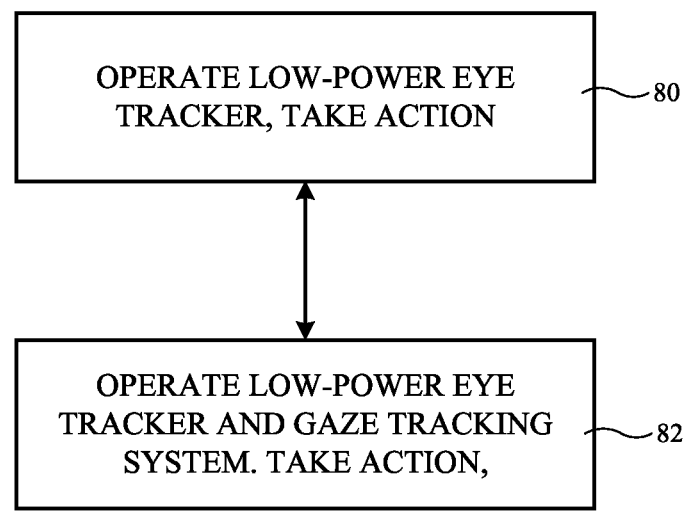
FIG. 8 is a flow chart of illustrative operations associated with using a head-mounted device in accordance with an embodiment.

FIG. 8 is a diagram showing operations involved in using device 10. In the illustrative example of FIG. 8, device 10 has both a low-power gaze tracking system (e.g., a system with light-emitting devices 40E and detectors 40D) for gathering gaze tracking information and has an image-sensor gaze tracking system (e.g., a glint-based gaze tracker having an image sensor and an infrared illumination system formed from light-emitting devices 40E). The glint-based system may consume more power than the low-powered system due to the presence of components such as camera 40D. To conserve power, it may sometimes be desired to turn off the glint-based system in favor of the low-powered system.

As an example, during the operations of block 80, device 10 may use the low-powered gaze tracking system in device 10 to gather measurements on the user's gaze while the glint-based gaze tracking is turned off to conserve power. The gaze information gathered during block 80 may inform device 10 of the direction of the user's view and/or may serve as user input (e.g., a user may select an option displayed by display 14 by dwelling the user's gaze on that displayed option for more than a predetermined time and/or the user's gaze may be used as pointing input that is combined with a voice command or other input to select an option).

Information on the current focus of a user's visual attention may be used by device 10 to provide context that device 10 uses in providing output to a user. If, as an example, a user is traveling along a street and is viewing a particular object, device 10 can use speakers, a display, haptic output devices, or other output devices to provide the user with information about the object (e.g., device 10 may provide the name of the object and other information about the object, may present selectable options associated with the object, etc. using visual output, audible output, and/or haptic output).

Device 10 can determine which objects are located in the vicinity of the user using an online database of objects (e.g., object identities and object locations) and/or using image recognition techniques. Device 10 can identify which object in the user's environment is being observed by the user using 1) information on the user's present geographic location gathered from a geographic location sensor such as a satellite navigation system sensor, 2) information on the orientation of device 10 relative to the environment from an orientation sensor such as an inertial measurement unit and/or other orientation sensor, and/or 3) information on the user's gaze (e.g. the direction in which the user's eyes are oriented relative to device 10). For example, device 10 can compare the user's direction of view (gaze direction gathered using the low-power gaze tracking system) to a map of the user's surroundings to determine which object is currently being viewed by the user. Information on an environmental object of interest (e.g., an object currently being viewed) may be retrieved wirelessly by device 10 from the on-line database and presented to the user. This information may include a visual label or other computer-generated content that is overlaid on the real-world image, an audible description, a visual or audio selectable option such as a selectable button presented by display 14 that a user may gaze at or otherwise select to direct device 10 to take further action. In some arrangements, virtual content such as the menu associated with computer-generated image 54 of FIG. 3 may be presented (e.g., to provide the user with options that can be selected using gaze gestures and/or other user input).

In configurations in which device 10 contains only a low-power gaze tracking system and no supplemental glint-based gaze tracking system or other gaze tracking systems based on image sensors, device 10 may continually perform the operations of block 80. In configurations in which device 10 contains an image-sensor-based gaze tracking system such as a glint-based gaze tracking system in addition to a low-power gaze tracking system, operations may, upon satisfaction of appropriate mode transition criteria, transition to the operations of block 82 in which the glint-based gaze tracking system is activated. Any suitable conditions may be used to trigger transition between blocks 80 and 82. For example, because less power may be used in monitoring a user's eyes during block 80 (when only photodetector signals of light beam reflections from the eyes are gathered) than is used during the operations of block 82, device 10 may default to operation in block 80 whenever device 10 can operate satisfactorily without using the capabilities of a glint-based gaze tracking system. When one or more capabilities of the gaze tracking system are determined to be useful (e.g., when gaze tracking with enhanced angular accuracy and/or response time are desired, when biometric identification operations such as iris scanning and/or retinal scanning operations that can be performed by camera 40C are desired, etc.), device 10 can transition to the operations of block 82.

During the operations of block 82, the glint-based gaze tracking system may replace the operations of the low-power gaze tracking system and/or may supplement the operations of the low-power gaze tracking system. Gaze tracking information from one or both tracking systems may, for example, be used to gather user input, to determine where in a scene the user's visual attention is directed (e.g., to provide device 10 with context), may be used to supply a foveated rendering display system with information on the user's direction of gaze, may be used to determine where to display computer-generated content on display 14 for viewing by a user, etc.).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted support structure;
   a first gaze tracking system having light-emitting devices and having light detectors in the head-mounted support structure, wherein the first gaze tracking system is a non-glint-based gaze tracking system; and
   a second gaze tracking system having an image sensor in the head-mounted support structure that measures eye glints, wherein the head-mounted device is configured to operate in a first gaze tracking mode and a second gaze tracking mode, the second gaze tracking system is off and the first gaze tracking system, including the light-emitting devices and the light detectors, is on in the first gaze tracking mode, and the second gaze tracking system is on and the first gaze tracking system is on in the second gaze tracking mode.

2. The head-mounted device defined in claim 1 wherein the head-mounted support structure is configured to form a frame that supports left and right lenses through which real-world objects are viewable from corresponding left and right eye boxes, the head-mounted device further comprising left and right display systems configured, respectively, to provide left and right images to the left and right eye boxes.

3. The head-mounted device defined in claim 2 wherein the first gaze tracking system is configured to consume less power than the second gaze tracking system.

4. The head-mounted device defined in claim 2 wherein the light detectors are arranged in rings around the left and right lenses.

5. The head-mounted device defined in claim 2 wherein the light detectors each include a photodiode and a lens.

6. The head-mounted device defined in claim 5 further comprising a bandpass filter between the photodiode and the lens of each of the light detectors.

7. The head-mounted device defined in claim 2 wherein the frame comprises visible-light-blocking-and-infrared-light-transmitting material that hides the light detectors from view and wherein the light detectors are configured to measure light that passes through the visible-light-blocking-and-infrared-light-transmitting material.

8. The head-mounted device defined in claim 2 wherein the light-emitting devices are configured to emit infrared light at a wavelength of 850-1000 nm.

9. The head-mounted device defined in claim 2 wherein the left and right display systems are configured to display computer-generated images containing menu items selectable using gaze information from the first and second gaze tracking systems.

10. The head-mounted device defined in claim 1 wherein the light-emitting devices are configured to emit infrared light beams that form the eye glints.

11. The head-mounted device defined in claim 1 wherein the head-mounted support structure has temple portions coupled to a main portion by hinges.

12. A head-mounted device, comprising:
    a head-mounted support structure;
    a lens supported by the head-mounted support structure through which a real-world object is viewable;
    a gaze tracking system having light-emitting devices that supply light beams and having light detectors comprising photodiodes in the head-mounted support structure that detect respective eye reflections of the light beams, wherein the gaze tracking system is a non-glint-based tracking system that is configured to track a gaze of an eye based on an amount of light reflected by the eye; and
    a glint-based gaze tracking system that includes an infrared image sensor in the head-mounted support structure that is configured to be selectively deactivated while the photodiodes are on in a first mode, wherein the infrared image sensor is configured to be on while the light-emitting devices and the photodiodes are off in a second mode, and the glint-based gaze tracking system is configured to detect glints on the eye.

13. The head-mounted device defined in claim 12 further comprising a display system configured to display a computer-generated image over the real-world object.

14. The head-mounted device defined in claim 13 wherein the infrared image sensor measures the glints produced by supplying the light beams to an eye box from which the real-world object is viewable through the lens.

15. The head-mounted device defined in claim 12 further comprising a speaker configured to produce audio in response to gaze information gathered using the gaze tracking system.

* * * * *